US008001202B2

(12) United States Patent
Gorty

(10) Patent No.: US 8,001,202 B2
(45) Date of Patent: *Aug. 16, 2011

(54) SYSTEM AND METHOD FOR PROVIDING CONFIGURATION DATA SUCH AS FOR CONFIGURING ELECTRONIC MAIL ACCESS

(75) Inventor: Suryanarayana Murthy Gorty, Redmond, WA (US)

(73) Assignee: Teamon Systems, Inc., Issaquah, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/795,965

(22) Filed: Jun. 8, 2010

(65) Prior Publication Data
US 2010/0250720 A1 Sep. 30, 2010

Related U.S. Application Data

(63) Continuation of application No. 10/776,423, filed on Feb. 11, 2004, now Pat. No. 7,739,336.

(60) Provisional application No. 60/493,624, filed on Aug. 8, 2003.

(51) Int. Cl.
*G06F 15/177* (2006.01)
*G06F 15/16* (2006.01)

(52) U.S. Cl. ........................... 709/206; 709/220

(58) Field of Classification Search .................. 709/206, 709/220
See application file for complete search history.

(56) References Cited

U.S. PATENT DOCUMENTS

| | | | |
|---|---|---|---|
| 5,968,117 A | 10/1999 | Schuetze | 709/206 |
| 6,059,838 A * | 5/2000 | Fraley et al. | 717/108 |
| 6,314,516 B1 | 11/2001 | Cagle et al. | 713/1 |
| 6,446,114 B1 | 9/2002 | Bulfer et al. | 709/206 |
| 6,741,855 B1 | 5/2004 | Martin et al. | 455/419 |
| 6,965,918 B1 | 11/2005 | Arnold et al. | 709/206 |
| 7,739,336 B2 * | 6/2010 | Gorty | 709/206 |
| 2001/0016821 A1 | 8/2001 | Debusk et al. | 705/2 |
| 2001/0029524 A1 | 10/2001 | Smith et al. | 709/206 |
| 2001/0034771 A1 | 10/2001 | Hutsch et al. | 709/217 |
| 2002/0112007 A1 | 8/2002 | Wood et al. | 709/206 |
| 2002/0143949 A1 | 10/2002 | Rajarajan et al. | 709/223 |
| 2002/0174194 A1 | 11/2002 | Mooney et al. | 709/219 |
| 2003/0004961 A1 | 1/2003 | Slothouber et al. | 707/100 |
| 2003/0038839 A1 | 2/2003 | Simpson et al. | 345/745 |
| 2003/0195934 A1 | 10/2003 | Peterson et al. | 709/206 |
| 2004/0030986 A1 | 2/2004 | Matsuda | 715/500 |
| 2004/0181580 A1 | 9/2004 | Baranshamaje | 709/206 |

FOREIGN PATENT DOCUMENTS

WO 02/25436 3/2002

OTHER PUBLICATIONS

Temple, "The Complete Idiot's Guide to Microsoft Outlook 2000", Alpha Books, 1999, p. 16.

* cited by examiner

*Primary Examiner* — Larry Donaghue

(74) *Attorney, Agent, or Firm* — Allen, Dyer, Doppelt, Milbrath & Gilchrist, P.A.

(57) ABSTRACT

A system, method and computer-readable medium provides configuration data, such as for electronic mail access. A configuration module retrieves the configuration data from a source of configuration data, such as a user system. The configuration in one aspect could be for accessing different electronic mailboxes of a user. Data object are generated. Each data object is submitted as a distributed object module to a web service. The web service in one aspect of the invention could be for a pass-through access for configuring electronic mailboxes.

17 Claims, 3 Drawing Sheets

SYSTEM AND METHOD FOR PROVIDING CONFIGURATION DATA SUCH AS FOR CONFIGURING ELECTRONIC MAIL ACCESS

RELATED APPLICATION

This application is a continuation of Ser. No. 10/776,423 filed Feb. 11, 2004, now U.S. Pat. No. 7,739,336 issued Jun. 15, 2010, which is based upon prior filed provisional application Ser. No. 60/493,624 filed Aug. 8, 2003, the entire disclosures of which are hereby incorporated herein by reference.

FIELD OF THE INVENTION

This invention relates generally to the field of obtaining configuration data, such as for electronic mailboxes, and this invention relates to accessing automatically different electronic mail accounts using configuration information from a user system.

BACKGROUND OF THE INVENTION

As electronic mail (email) increases in popularity, it has become the norm for a user to maintain several separate mailboxes to help manage their email. Typically, the user will have a mailbox dedicated to corporate email and another mailbox dedicated to personal email. Some users have additional mailboxes. For example, these additional email addresses are used when registering for services on the Internet.

Managing multiple mailboxes can be challenging because the user has to check periodically each mailbox for new email. Services such as Yahoo™ now provide mailbox services that automatically poll a predefined list of mailboxes to determine if new email has been received. New emails that have been received in any of the polled mailboxes are retrieved into the requesting mailbox. As a result, the user only has to check the requesting mailbox to determine if new email has arrived in any of the other mailboxes. This reduces the number of mailboxes that are required to be checked periodically. Other services allow a user to access their mailboxes through a plurality of devices such as, but not limited to, mobile phones, mobile computing devices, for example, personal digital assistants (POA's) and other communications devices.

Each of the separate mailboxes has a unique set of configuration parameters, such as a mailbox server name or a mailbox server address. Additionally, as part of these configuration parameters, each of the mailboxes may be implemented in one of a variety of mailbox protocols, such as Post Office Protocol (POP) or Internet Message Access Protocol (IMAP), giving rise to differing sets of configuration parameters for each of the mailboxes. Typically, the user would have to determine these configuration parameters for each of the mailboxes and configure manually a web service associated with a web server to access each of the mailboxes.

One proposal in U.S. patent application publication no. 2002/0174194 provides a single web-based interface that gives the user access to a plurality of different message accounts on different message servers. This proposal allows email clients to access only a subset, namely messaging, of an IMAP server, and requires a user to establish all configuration parameters for the IMAP server functionality. Other similar proposals requiring a user to determine and manually configure a web service for configuration parameters are disclosed in U.S. Pat. No. 5,968,117 and U.S. published patent application no. 2002/0112007, where message sources are established during setup and a technical support can be called. U.S. Pat. No. 6,446,114 discloses the use of an agent that searches a user database to determine a list of messaging systems the user subscribes. The agent recalls from an application database any procedures for accessing the messaging systems and logs onto each messaging system to retrieve new messages.

SUMMARY OF THE INVENTION

The present invention is advantageous and now provides a system, method and computer-readable medium that uses a configuration module that can provide configuration data for a requesting web service and act as a pass-through service. The web service, for example, could be a new internet service provider (ISP) that uses configuration data for accessing electronic mail from another internet service provider. The mailbox could be a gateway window into another electronic mailbox and use configuration data on-the-fly. The module could automatically configure access to electronic mail from a plurality of different electronic mailboxes.

In one aspect of the present invention, a user system includes a plurality of different email clients, each with different configuration data for accessing respective electronic mailboxes that are different from each other. A configuration module retrieves the configuration data required for accessing the different electronic mailboxes of a user. The configuration module is operative for generating data objects for each electronic mailbox relating to the configuration data. The configuration module also submits each data object as a distributed object module to a web service. The web service can be configured as a pass-through or configured to access the respective electronic mailboxes associated with each data object.

In one aspect of the present invention, a web service interface module formats the data objects as distributed object modules for submission to a web service. The web browser or email client accesses the web service or a targeted electronic mailbox. The user system can include a personal computer or mobile communications device.

In another aspect of the present invention, the configuration module is implemented as a component object module that could be an ActiveX control. In yet another aspect of the present invention, the data objects are formatted within the configuration module using an extensible mark-up language (XML) for transmission to an XML-compliant web service. The user system could include a plurality of user computing sources. The electronic mailboxes to be accessed could reside on an internet or intranet server. A method is also set forth and a computer-readable medium that includes a plurality of import modules, data objects and a web service interface module.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
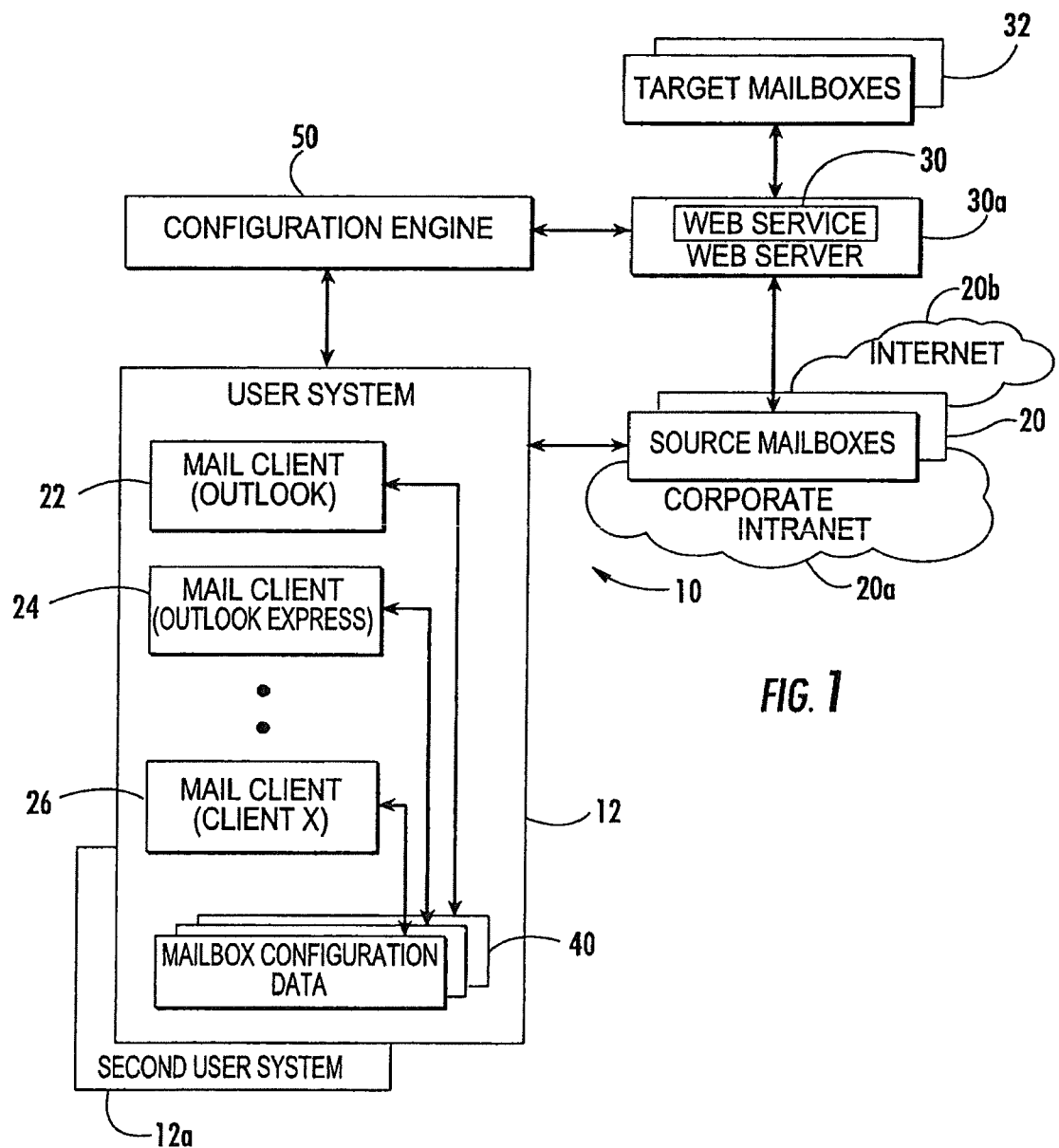
FIG. 1 is a block diagram of a system for providing configuring data to a web service, such as configuring for electronic mail access, according to one aspect of the present invention.

FIG. 1 is a block diagram of an electronic mail system 10, as one non-limiting example of the present invention, that permits configuration of different mailboxes and allows configuration for automatic access of different email accounts. It should be understood that the present invention provides a system and method that provides configuration data for a web service that could be used as a pass-through service or used for configuring a web service or other agent for electronic mail access. In one aspect of the invention, a source of configuration data could be a user system and the configuration module retrieves the configuration data from a user system typically at the request of a web service. This configuration module could be operative for generating data objects related to the configuration data and submitting each data object as a distributed object module to a web service. The configuration data could be data used for accessing an electronic mailbox. The web service could be a new internet service provide (ISP) that uses configuration data for accessing electronic mail from another or previous Internet service provider. The mailbox could be a gateway window into another electronic mailbox and the gateway window could use configuration data on-the-fly.

The web service interface module could format data objects as distributed object modules for submission to a web service. The user system could be a web browser or e-mail client. A user operates with the system from his user system 12, such as a home or work computer, or wireless, mobile communications device such as a hand-held Blackberry unit, as one non-limiting example. The user system could be a plurality of systems. The user is able to access a plurality of source mailboxes 20 using at least one of a plurality of email clients 22, 24, and 26. A web service 30 as part of a web server 30a allows the user to access the source mailboxes 20 through the web service 30, or from one or more target mailboxes 32. The web service 30 or the target mailboxes 32 may be accessed using a variety of methods known to those skilled in the art. In example embodiments, the web service 30 and the target mailboxes 32 may be accessed using a web browser, an email client, or another application configured to access the web service 32 or the target mailbox 30. The web browser, mail client or other application for accessing the web service 30 or target mailboxes 32 may be resident on a variety of systems that could include, but are not limited to, personal computers and mobile communications devices. Although the system of the present invention will be described in relation to its use with a personal computer, the system of the present invention could be used with a mobile phone, personal digital assistant (PDA), or other communications device.

It should be understood that the use of the term web services 30 is broad and can also refer to the many application services on web servers used by those skilled in the art. Web services usually include a combination of programming and data, which are typically available from a web server for web users or the use of other web-connected programs as provided by an application service provider. Typically, web services use an extensible mark-up language (XML) as a standard for formatting data to be communicated. Any type of arrangement can be used to access the web service, including a peer-to-peer arrangement, a central server, or other architecture and communications. Middleware could also be used. Data formats can be standardized and data exchanged using the Extensive Mark-up Language (XML), which is also the foundation for the Web Services Description Language (WSDL). Different web servers could be used, including the open source Apache or Microsoft's Internet Information Server (IIS). Other web services could include Novel's web server for users of its netware operating system or the IBM family of Lotus domino servers, for example, for IMB's OS/390 and AS/400 customers. Naturally, any web server should be able to download requests for File Transfer Protocol (FTP) files in a preferred embodiment.

The target mailbox 32 or the web service 30 requires complete configuration data 40 for each of the source mailboxes 20 in order to help the user access these mailboxes 20. The configuration data 40 may include mailbox server name, access port, password, username, incoming mail server, outgoing mail (SMTP) server, mail server type, such as IMAP, and other configuration parameters that may be required to configure user access to one or more of the source mailboxes 20.

It should be understood that email providers are free to use any convention they choose for configuration parameters. For example, many email providers may use a "defacto standard" convention for configuration parameters, such as using a mail host name of "mail.<MailDomain>", where <MailDomain> represents the provider's e-mail domain (i.e., "foo.com"). Another example could be an address, such as JohnSmith@earthlink.net. The user, of course, may only know their email address and a password, for example, "password." Information not known to the normal user would be POP3 server: pop.earthlink.net, the SMTP server: smtp-auth.earthlink.net, the domain of earthlink.net, a different user name as indicated above, the FTP server ftp-www.earthlink.net, an access ID and DNS address, for example, 207.69.188.XXX, or the outgoing mail (SMTP) server, and mail server type, such as IMAP.

A user is required to provide any email configuration data 40 to the web service 30 or to a unified target mailbox 32. According to one aspect of the present invention, a configuration engine 50 as a software module automatically retrieves the configuration data 40 for one or more of the source mailboxes 20 from at least one of the email clients 22, 24, and 26. The configuration engine 50 transmits some or all of the configuration data 40 to the web service 30 allowing the web service 30 or the target mailboxes 32 to be configured to access one or more of the source mailboxes 20 without requiring the user to provide the configuration data 40.

In an example embodiment for the present invention, a number of the source mailboxes 20 reside on servers within a corporate intranet 20a while other source mailboxes 20 reside within servers on the Internet 20b. As will be apparent to those skilled in the art, the mailboxes may be accessed using a variety of protocols such as POP, IMAP or a proprietary mail protocol such as that used in the Microsoft™ Exchange™ server.

The user accesses the source mailboxes 20 using one of a plurality of email clients 22, 24, and 26 that are configured in the user system 12 to access the source mailboxes 20. Each email client 22 can access one or more of the source mailboxes 20. Mailbox configuration data 40 that is specific to a respective email client 22, 24, and 26, and the mail protocol used to access the source mailboxes 20, is associated with each respective email client 22, 24, and 26. The email clients 22, 24, and 26 and the configuration data 40 reside on the user system 12. In other embodiments, the email clients 22, 24, and 26 and the respective configuration data 40 could reside on a plurality of user systems and not just one system as shown, for example, by the second user system 12a. In some embodiments, the user system 12 may be any one of a variety of computing devices such as a personal computer, or a mobile computing or communications device, including a PDA or mobile phone.

Figure 2:
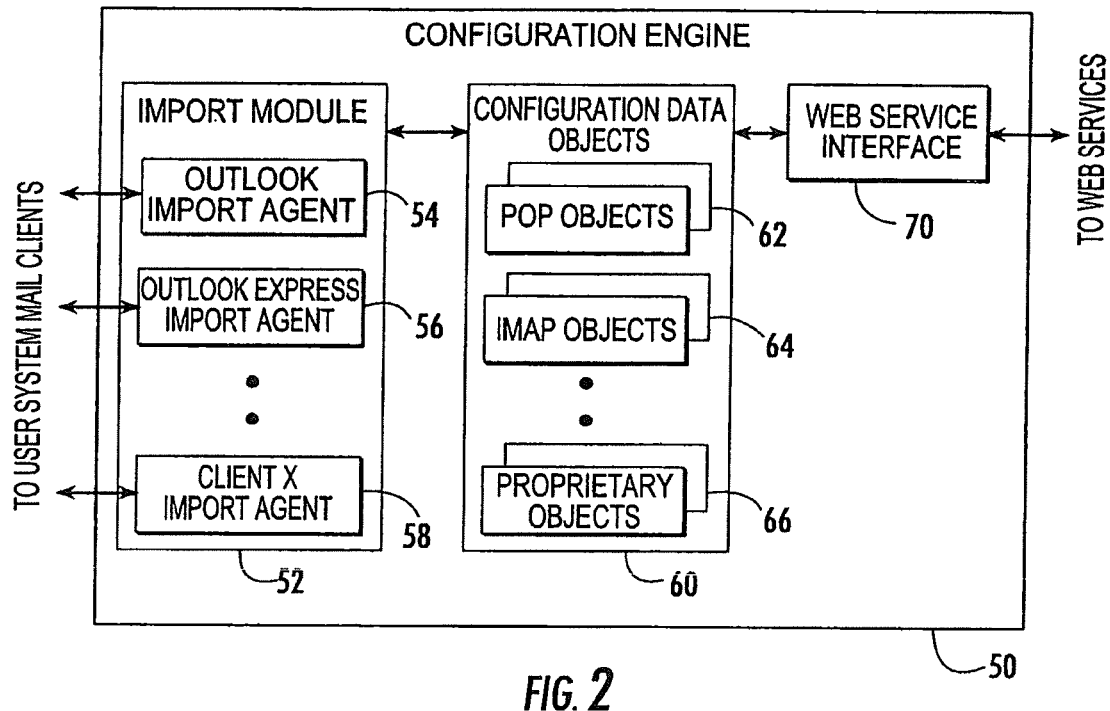
FIG. 2 is a block diagram of the configuration engine that can be used with the system shown in FIG. 1.

FIG. 2 is a block diagram of one example of the configuration engine 50 that retrieves mailbox configuration data 40. The configuration engine 50, in one aspect of the present invention, includes an import module 52 having one or more import agents 52, 56, and 58 that retrieve configuration data 40. The configuration engine 50 also includes configuration data objects 60 formed of one or more mail protocol specific objects 62, 64, and 66 and a web service interface 70 for formatting the configuration data objects 60 for the web service 30.

Each import agent 52, 56, 58 in the import module 52 is designed to retrieve respective configuration data 40 from a specific type of email client and generate one or more configuration data objects 60. The configuration data 40 related to a respective email client may reside in various locations. The respective import agent 54, 56, and 58 retrieves any configuration data 40 from the location specific to each email client 22, 24, and 26. In a non-limiting example, the import agent 54 is designed to retrieve configuration data from the Microsoft™ Outlook™ email client 22. Import agent 56 is designed to retrieve configuration data 40 from the Microsoft™ Outlook Express™ 24 email client. In other example embodiments, import agents can be designed to retrieve configuration data from other types of email clients such as, but not limited to, Eudora and Netscape email clients. In further example embodiments, an import agent may use a Messaging Application Programming Interface (MAPI) to retrieve configuration data 40 for a MAPI-compliant email client. MAPI provides an application programming interface (API) to ensure system independence for messaging applications. A layer of functionality could be provided between applications and any underlying messaging systems and act as messaging middleware. MAPI-compliant applications would communicate through a MAPI subsystem to MAPI service providers that perform requested actions for clients and pass data back through a MAPI system to a MAPI client.

Also, in a non-limiting embodiment, the configuration data 40 could reside in the configuration registry of the user system 12. In other example embodiments, the data may reside in email client specific configuration stores.

The configuration data objects 60 generated by the import module 52 would vary based on the protocol used to access the source mailboxes 20 for which a mail client 22, 24, and 26 is configured. In an example embodiment, the Microsoft Outlook Express mail client 24 can access source mailboxes 20 that use the Post Office Protocol (POP) or Internet Mail Access Protocol (IMAP). POP, of course, is the internet mail server protocol that provides incoming message storage. The more recent protocol is POP3. POP is operative with the Simple Mail Transfer Protocol (SMTP). Any mail server must run both protocols if it is to receive, store and forward messages. The SMTP protocol exchanges messages from one mail server to another and hands messages to the required POP server for an email mailbox. A POP server can receive a message and hold it until another POP server is available. The IMAP version 4 also uses the SMTP transport mechanism, but it is a more flexible protocol because IMAP allows users to store mail on a mail server without downloading all new messages to a local machine. Internet mail servers, of course, run SMTP in either POP or IMAP and receive incoming messages from any source without identity checking. Thus, mail can be selectively downloaded and read, message headers reviewed, hierarchical message stores built, address books supported, and documents linked, authenticated and searched.

In this example, the configuration data objects 60 generated by the Outlook Express Import Agent 56 can be POP objects 62 or IMAP objects 64, for example. In other embodiments, configuration data objects 66 could be generated for source mailboxes 20 that use proprietary mail access protocols. As is obvious to those skilled in the art, a variety of mail access protocols exist and configuration data objects 60 could be created for some or all of these mail access protocols.

The web service interface 70 formats the configuration data objects 60 generated by the import module 52 for submission to the web service 30. As is obvious to one skilled in the art, there are a variety of formats for submitting data to the web service 30. In one non-limiting example, Extensible Mark-up Language (XML) can be used to format the data for submission to an XML-compliant web service 30. The web service 30 can also be a Simple Object Access Protocol (SOAP) compliant service.

XML, of course, as an extensible mark-up language, is a subset of the standard generalized mark-up language (SGML) and allows data to be stored and published on websites and richer in presentation. Custom tags can be created to define the content of documents. Common information formats can be created and the format and data shared on the internet, corporate intranets, and/or other networks. The mark-up symbols in XML are unlimited and self-defining. The channel definition format (CDF) can describe any channel and a specific CDF file can contain data that specifies an initial web page and how frequently it is updated.

SOAP allows one program running in one kind of operating system to communicate with the program in the same or another type of operating system by using the HTTP and XML for information exchange. For example, SOAP could specify how to encode an HTTP header and an XML file, thus, allowing one computer to call a program in another computer and pass data, and while also dictating how it can return a response. SOAP is advantageous to allow data to pass through firewall servers that screen-out requests other than those for known applications through a designated port. SOAP is an XML-based protocol that has at least three parts, including (a) an envelope to define a framework for describing what is in a message, (b) a set of encoding rules for expressing application-defined data types, and (c) a convention for representing remote procedure calls and responses. For example, data can be formatted using XML for submission to a web service 30 that is SOAP compliant. For purposes of this description, the end of this detailed description sets forth an example of data formatted using XML for submission to a SOAP compliant web service. In other embodiments, the web service 30 may require a proprietary format for data submission, and the web service interface 70 will format the configuration data 40 in the proprietary format.

The configuration engine 50 is preferably implemented using a series of instructions for execution on a computing device. In one example embodiment, the configuration engine 50 is implemented as an ActiveX control. ActiveX is operative as a Component Object Model (COM) and provides the framework for building software components that communicate with each other. Distributed COM (DCOM) allows different ActiveX components to communicate across networks, such as the internet. ActiveX controls can be automatically downloaded and executed by a web browser. Distributed object applications can be built in active web pages, and ActiveX controls can be downloaded to different browsers and clients. ActiveX controls can be held in a web browser as a container and distributed over the internet or corporate intranets. ActiveX controls can also manage and update web content and client systems and work closely with a user interface of a targeted operating system. It should be understood that Java Applets or similar component objects could also be used instead of ActiveX controls. It should also be understood that other object models can be used in accordance with the present invention, as well as other scripting languages. It is also possible that object linking and embedding custom controls could be used. Of course, it should be understood for purposes of the present invention that an object model control could also be any type of dynamic link library (DLL) module that runs in a container as an application program uses a component object model program interface.

In the example embodiment, a user accesses a web browser to access a configuration web page provided by the web service 30. The user may request that the configuration engine 50 be downloaded and executed, thereby automatically retrieving configuration data 40 to configure the web service 30 to access source mailboxes 20 through the target mailbox 32 or through the web service 30. In other example embodiments, the configuration engine 50 may be implemented using Java and Java Applets. The example embodiments are not meant to limit the scope of the invention. As is obvious to those skilled in the art, there are numerous ways in which the configuration engine may be implemented.

Figure 3:
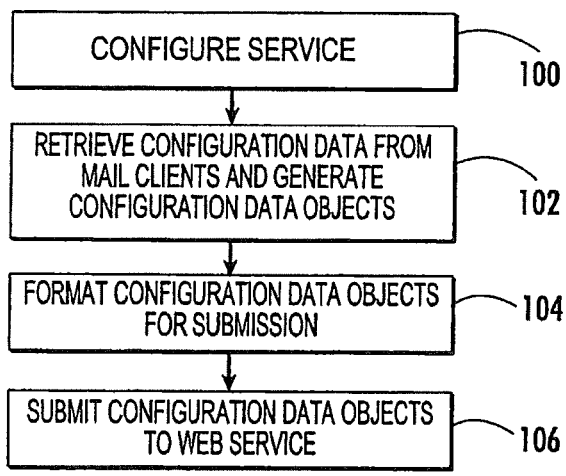
FIG. 3 is a flowchart illustrating a method of retrieving and formatting configuration data objects according to one aspect of the present invention.

FIG. 3 is a flowchart illustrating an example of a non-limiting method of automatically configuring the web service 30 to access source mailboxes 20 through the target mailbox 32 or the web service 30. At step 100, the user requests that the target mailbox 32 or web service 30 be configured to access one or more of the source mailboxes 20. In another non-limiting example, the configuration engine 50 is implemented as an ActiveX control that is downloaded and executed on the user system 12. At step 102, the import module 52 of the configuration engine 50 retrieves configuration data 40 for the source mailboxes 20 from the user system 12 and generates configuration data objects 60. At step 104, the web service interface 70 of the configuration engine 50 formats the configuration data objects 60 for submission to the web service 30. At step 106, the formatted configuration data is submitted to the web service 30.

An example of data formatted using XML for submitting to a SOAP compliant web service 30 is now set forth.

```
<?xml version="1.0" ?>
<IMPORTCONTENT>
    <EMAILCONFIG>
        <POPMAIL>
            <LeaveMail>true</LeaveMail>
            <UseSPA>false</UseSPA>
```

```
            <UserId>johndoe1</UserId>
            <Port>110</Port>
            <TimeOut>60</TimeOut>
            <IsSecure>false</IsSecure>
            <SkipAccount>true</SkipAccount>
            <Server>pop.mailserver.net</Server>
            <EmailId>johndoe1@mailserver.net</EmailId>
            <Password>testpassword</Password>
            <DisplayName>John Doe 1</DisplayName>
        </POPMAIL>
        <POPMAIL>
            <LeaveMail>true</LeaveMail>
            <UseSPA>false</UseSPA>
            <UserId>JohnDoe2@mailworld.net</UserId>
            <Port>111</Port>
            <TimeOut>60</TimeOut>
            <IsSecure>true</IsSecure>
            <SkipAccount>true</SkipAccount>
            <Server>ipostoffice.mailworld.net</Server>
            <EmailId>JohnDoe2@mailworld.net</EmailId>
            <Password>testpassword</Password>
            <DisplayName>John Doe 2</DisplayName>
        </POPMAIL>
        <POPMAIL>
            <LeaveMail>true</LeaveMail>
            <UseSPA>true</UseSPA>
            <UserId>JohnDoe3</UserId>
            <Port>110</Port>
            <TimeOut>60</TimeOut>
            <IsSecure>false</IsSecure>
            <SkipAccount>false</SkipAccount>
            <Server>pop3.email.msn.com</Server>
            <EmailId>johndoe3@msn.com</EmailId>
            <Password>testpassword</Password>
            <DisplayName>John Doe 3</DisplayName>
        </POPMAIL>
        <POPMAIL>
            <LeaveMail>true</LeaveMail>
            <UseSPA>true</UseSPA>
            <UserId>555555,5555</UserId>
            <Port>110</Port>
            <TimeOut>60</TimeOut>
            <IsSecure>false</IsSecure>
            <SkipAccount>true</SkipAccount>
            <Server>pop.compuserve.com</Server>
            <EmailId>johndoe4@somehere.com</EmailId>
            <Password>testpassword</Password>
            <DisplayName>John Doe 4</DisplayName>
        </POPMAIL>
        <WEBMAIL>
            <UserId>blair</UserId>
<Server>http://exchange.123office.com/exchange/johndoe5</Server>
            <EmailId>johndoe5@123office.com</EmailId>
            <Password>testpassword</Password>
            <DisplayName>John Doe 5</DisplayName>
        </WEBMAIL>
        <WEBMAIL>
            <UserId>johndoe6@msn.com</UserId>
            <Server>http://oe.msn.msnmail.hotmail.com/cgi-bin/hmdata</Server>
            <EmailId>johndoe6@msn.com</EmailId>
            <Password>testpassword</Password>
            <DisplayName>John Doe 6</DisplayName>
        </WEBMAIL>
        <WEBMAIL>
            <UserId>johndoe7@hotmail.com</UserId>
<Server>http://services.msn.com/svcs/hotmail/httpmail.asp</Server>
            <EmailId>johndoe7@him.com</EmailId>
            <Password>testpassword</Password>
            <DisplayName>John Doe 7</DisplayName>
        </WEBMAIL>
        <IMAP>
            <UserId>johndoe8</UserId>
            <Port>110</Port>
            <TimeOut>60</TimeOut>
            <IsSecure>false</IsSecure>
            <SkipAccount>true</SkipAccount>
            <Server>imap.cs.com</Server>
```

-continued

```
        <EmailId>johndoe8@cs.com</EmailId>
        <Password>testpassword</Password>
        <DisplayName>John Doe 8</DisplayName>
    </IMAP>
    <IMAP>
        <UserId>johndoe9@corporation.com</UserId>
        <Port>10001</Port>
        <TimeOut>120</TimeOut>
        <IsSecure>false</IsSecure>
        <SkipAccount>true</SkipAccount>
        <Server>imap.corporation.com</Server>
        <EmailId>johndoe9@corporation.com</EmailId>
        <Password>testpassword</Password>
        <DisplayName>John Doe 9</DisplayName>
    </IMAP>
  </EMAILCONFIG>
</IMPORTCONTENT>
```

An exemplary hand-held mobile wireless communications device 1000 that can be used in the present invention is further described in the example below with reference to FIG. 4. The device 1000 includes a housing 1200, a keyboard 1400 and an output device 1600. The output device shown is a display 1600, which is preferably a full graphic LCD. Other types of output devices may alternatively be utilized. A processing device 1800 is contained within the housing 1200 and is coupled between the keyboard 1400 and the display 1600. The processing device 1800 controls the operation of the display 1600, as well as the overall operation of the mobile device 1000, in response to actuation of keys on the keyboard 1400 by the user.

The housing 1200 may be elongated vertically, or may take on other sizes and shapes (including clamshell housing structures). The keyboard may include a mode selection key, or other hardware or software for switching between text entry and telephony entry.

Figure 4:
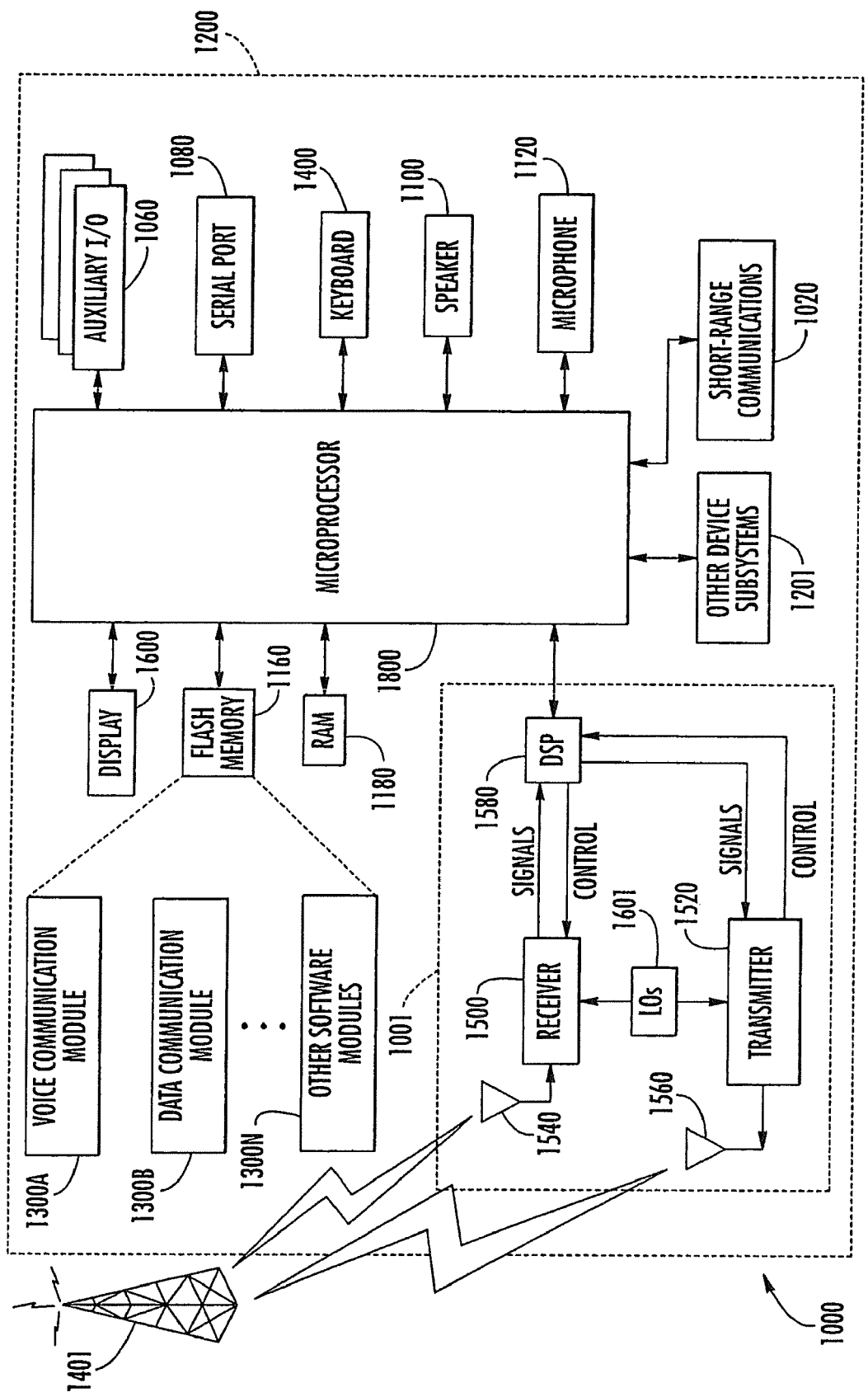
FIG. 4 is a schematic block diagram illustrating an exemplary mobile wireless communications device for use in the present invention.

In addition to the processing device 1800, other parts of the mobile device 1000 are shown schematically in FIG. 4. These include a communications subsystem 1001; a short-range communications subsystem 1020; the keyboard 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system. Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 1000.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keyboard 1400 and/or some other auxiliary I/O device 1060, such as a touchpad, a rocker switch, a thumb-wheel, or some other type of input device.

The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

It will be appreciated that the above description relates to preferred embodiments by way of example only. Many variations on the systems and methods described above will be obvious to those knowledgeable in the field, and such obvious variations are within the scope of the invention as described and claimed, whether or not expressly described. For example, automatic configuration systems and methods according to aspects of the invention may be applied to other types of data systems than mail systems and other mail clients, access protocols and data formats other than those specifically described above and shown in the drawings.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications system comprising:
   a user device comprising
      a processor configured to access a plurality of source mailboxes, and
      a mailbox configuration data source configured to store configuration parameters to permit said processor to access the plurality of source mailboxes;
   a web service configured to allow said user device to access the plurality of source mailboxes; and
   a configuration module configured to retrieve from said mailbox configuration data source, without user intervention, respective configuration parameters for at least one source mailbox, and to configure said web service also without user intervention, said configuration module comprising at least a portion remote from said user device;
   said web service comprising a configuration web page for allowing said user device to execute said configuration module.

2. The communications system according to claim 1, wherein said web service comprises an Internet service provider (ISP) that uses configuration parameters for accessing electronic mail from another internet service provider.

3. The communications system according to claim 1, wherein the plurality of source mailboxes comprises a plurality of interfaces that use the configuration parameters on-the-fly for accessing respective electronic mailboxes.

4. The communications system according to claim 1, wherein said user device comprises one of a personal computer and a mobile communications device.

5. The communications system according to claim 1, wherein said configuration module is implemented as a component object module.

6. The communications system according to claim 1, wherein said configuration module is implemented as an ActiveX control.

7. A communications system comprising:
   a user device comprising
      a processor and at least one email client configured to use said processor for accessing a plurality of source mailboxes, and
      a mailbox configuration data source configured to store configuration parameters to access the plurality of source mailboxes from said at least one email client;
   a web service configured to allow said user device to access the plurality of source mailboxes, said web service comprising an Internet service provider (ISP) that uses configuration parameters for accessing electronic mail from another internet service provider; and
   a configuration module configured to retrieve from said mailbox configuration data source, without user intervention, respective configuration parameters for at least one source mailbox, and to configure said web service also without user intervention, said configuration module comprising at least a portion remote from said user device;
   said web service comprising a configuration web page for allowing said user device to execute said configuration module.

8. The communications system according to claim 7, wherein the plurality of source mailboxes comprises a plurality of interfaces that use the configuration parameters on-the-fly for accessing respective electronic mailboxes.

9. The communications system according to claim 7, wherein said user device comprises one of a personal computer and a mobile communications device.

10. The communications system according to claim 7, wherein said configuration module is implemented as a component object module.

11. The communications system according to claim 7, wherein said configuration module is implemented as an ActiveX control.

12. A communications method for a user device comprising a processor and a mailbox configuration data source configured to store configuration parameters to permit the processor to access a plurality of source mailboxes, the method comprising:
   configuring a web service to allow the user device to access the plurality of source mailboxes; and
   providing a configuration module configured to retrieve from the mailbox configuration data source, without user intervention, respective configuration parameters for at least one source mailbox, and to configure the web service also without user intervention, the configuration module comprising at least a portion remote from the user device;
   the web service comprising a configuration web page for allowing the user device to execute the configuration module.

13. The method according to claim 12, wherein the web service comprises an internet service provider (ISP) that uses configuration parameters for accessing electronic mail from another internet service provider.

14. The method according to claim 12, wherein the plurality of source mailboxes comprises a plurality of interfaces that use the configuration parameters on-the-fly for accessing respective electronic mailboxes.

15. The method according to claim 12, wherein the user device comprises one of a personal computer and a mobile communications device.

16. The method according to claim 12, wherein the configuration module is implemented as a component object module.

17. The method according to claim 12, wherein the configuration module is implemented as an ActiveX control.

* * * * *